United States Patent Office 3,440,171
Patented Apr. 22, 1969

3,440,171
SURFACE ACTIVE COMPOSITIONS
Roy R. Warren, St. Albans, W. Va., assignor to Union Carbide Corporation, a corporation of New York
No Drawing. Filed June 29, 1964, Ser. No. 378,940
Int. Cl. C11d 1/52
U.S. Cl. 252—152    6 Claims

ABSTRACT OF THE DISCLOSURE

The formation of a gel upon addition of a straight-chain alkylbenzene sulfonic acid to an aqueous solution of an alkanolamine is prevented by the addition of a water-soluble inorganic salt such as an alkali metal sulfate or chloride.

This invention relates to novel aqueous surface active compositions and to a method for their production. More particularly, this invention relates to novel normally-liquid aqueous compositions containing alkanolamine alkylbenzene sulfonates and to a method for their production.

It is well known that alkanolamine alkylbenzene sulfonates are surface active materials. These compounds find particular utility in high-lather-detergent compositions, such as hair shampoos or bubble baths, and, for this purpose, are generally sold in the form of aqueous solutions containing about 60 weight per cent alkanolamine alkylbenzene sulfonate. Consequently, these salts are generally produced by adding an alkylbenzene sulfonic acid to an aqueous solution of an alkanolamine.

Until recently, the alkylbenzene sulfonic acids employed in this application were those derived from the so-called "hard" alkylbenzenes, i.e., those wherein the alkyl group bonded to the benzene nucleus is a branched (non-linear) alkyl group, such as the "tetrapropyl" group. The resulting alkanolamine salts were very water soluble, and free-flowing solutions containing up to 60 weight percent or more alkanolamine alkylbenzene sulfonate were readily obtained. Uexpectedly and surprisingly, it has been found that, when the alkyl group is linear rather than branched, a free-flowing solution is not obtained. Instead, a gel is formed which, at concentrations as low as 40 weight percent of alkanolamine alkylbenzene sulfonate in water, is a solid at room temperature.

It has been found by this invention, however, that by incorporating a small amount of a water-soluble inorganic salt in the composition the problem of gelation is avoided and a normally liquid, i.e., (free-flowing at room temperature, composition is obtained even at concentrations of alkanolamine alkybenzene sulfonate as high as about 90 weight percent. Although any water-soluble inorganic salt can be employed, the alkali metal or alkaline earth salts are preferred, with the alkali metal salts being particularly preferred. Because of the similarity of ammonium salts to those of the alkali metals, the term alkali metal salt, as employed herein, also embraces ammonium salts. Illustrative of suitable salts are halides, such as sodium chloride, potassium chloride, calcium chloride, ammonium chloride, potassium iodide and the like; sulfates, such as sodium sulfate, potassium sulfate, ammonium sulfate, magnesium sulfate and the like; nitrates, such as potassium nitrate, calcium nitrate and the like; carbonates such as sodium carbonate; bicarbonates such as calcium bicarbonate; phosphates such as sodium phosphate, potassium phosphate, ammonium phosphate and the like; et cetera. By the term "water soluble" a salt having sufficient solubility to be in aqueous solution in a gel-inhibiting amount.

The gel-inhibiting amount of inorganic salt is not highly critical, and amounts of from 0.1 to about 5.0 weight percent, based on product alkanolamine alkylbenzene sulfonate, are generally suitable. Amounts of less than 0.1 percent are generally insufficient to prevent the formation of a gel, while little or no advantage is obtained by employig amounts in excess of 5.0 percent, although such amounts can be employed if desired. Amounts of from 0.5 to 2.5 weight percent are preferred.

The alkanolamines employed in producing the salts by the process of this invention have the general formula:

$$(HOR)_nNH_{(3-n)}$$

wherein R is a divalent alkanediyl group of from 2 to 3 carbons whose valence bonds are from different carbons and n is an integar having a value of from 1 to 3, inclusive. Illustrative of these alkanolamines are triethanolamine, diethanolamine, ethanolamine, triisopropanolamine, tri-n-propanolamine, and the like. The alkanolamine employed can be a single amine or a mixture of two or more alkanolamines. Triethanolamine is preferred.

The alkylbenzene sulfonic acids employed in accordance with the process of this invention are those wherein the alkyl group is an unbranched alkyl group of from about 7 to about 20, preferably from about 10 to about 15, carbon atoms. Particularly preferred straight-chain alkyl groups are those wherein the alkyl group is bonded to the benezene nucleus through a secondary carbon atom, i.e., a carbon atom which is bonded to two other carbons of the alkyl chain. These preferred alkyl-benzene sulfonic acids are represented by the formula:

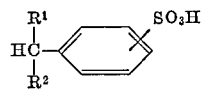

wherein $R^1$ and $R^2$ are n-alkyl groups, each having at least 1 carbon atom, and the sum of the carbons in $R^1$ and $R^2$ is in the range of from 6 to 19, preferably 9 to 14, carbons. The acid need not be a pure compound, and generally is a mixture of secondary alkyl isomers, and, in addition, can be a mixture of alkylbenzene homologs.

The ratio of alkanolamine to alkylbenzene sulfonic acid is not highly critical to this invention, and suitable ratios will be apparent to those of ordinary skill in the art. For most commercial applications it is desirable that the amount of amine be the stoichiometric amount sufficient to neutralize the acid or slightly less, to avoid an amine odor in the final product.

The concentration of alkanolamine alkylbenzene sulfonate in the product is not highly critical to this invention. However, if the concentration in the aqueous product exceeds about 90 weight percent, gel formation is likely to occur, even in the presence of added inorganic salt, and compositions having concentrations above about 70 weight percent are generally cloudy. Concentrations in the range of 50 to 70 weight percent, preferably about 60 weight percent, are generally employed for most commercial applications, although lower concentrations are obviously permissible.

The conditions under which the alkanolamine, water, alkylbenzene sulfonic acid and inorganic salt are mixed are not highly critical to this invention, and are known to those familiar to the art. In general, temperatures below about 70° C. are employed to prevent the occurrence of side reactions which would result in a discolored product. On the other hand, temperatures of at least about room temperature (20–25° C.) and above are desired to ensure a solution of low viscosity during mixing.

A suitable technique comprises adding the alkylbenzene sulfonic acid to an aqueous solution of alkanolamine, inorganic salt and water, with stirring, at a temperature of from about 30° C. to about 70° C., preferably from about 40° C. to about 55° C. The resulting salt solution can be employed directly for any suitable application, with or without concentration or dilution, as may be desired, and without purification.

The following examples are illustrative.

EXAMPLE 1

To a solution of 21.9 grams of a commercial grade of triethanolamine in 40 grams of water was added 45 grams of an alkylbenzene sulfonic acid mixture[1] at a

[1] A mixture of alkylbenzene sulfonic acids having from 11 to 13 carbons in a secondary, straight chain alkyl group and having an average of about 12 carbons in the alkyl group.

temperature below 50° C. with stirring. A gel formed immediately on the addition of the acid and the viscosity of the aqueous mixture increased with continued addition of acid. The mixture, after the addition of all the acid, was a solid at room temperature.

If an alkylbenzene sulfonic acid having a branched-chain alkyl group, such as "tetrapropylbenzene sulfonic acid," is substituted for the one employed, a clear, free-flowing solution is obtained.

EXAMPLE 2

To the gel produced as described in Example 1 was added a solution of 1.0 gram of anhydrous sodium sulfate in 3.0 grams of water. An immediate reduction in viscosity was observed and, after standing overnight, there was obtained a clear, free-flowing solution.

EXAMPLE 3

To a solution of 1.0 gram of anhydrous sodium sulfate and 21.9 grams of triethanolamine in 40 grams of water was added, with stirring, 45 grams of the linear alkylbenzene sulfonic acid employed in Example 1, while maintaining the mixture below 50° C. by cooling. There was obtained a clear, free-flowing solution of 60.1 weight percent triethanolamine salt of the alkylbenzene sulfonic acid, which had a pH of 5.5.

EXAMPLE 4

Employing apparatus, materials and procedures similar to those described in Example 2, except that 1.0 gram of sodium chloride was substituted for the sodium sulfate, a clear, free-flowing solution was obtained.

What is claimed is:

1. The method for producing an aqueous solution of a salt of an alkanolamine and an alkylbenzenesulfonic acid which comprises adding a gel-inhibiting amount of a water-soluble salt selected from a member of the group consisting of alkali metal salts of inorganic acids and alkaline earth metal salts of inorganic acids to an aqueous medium of (1) an alkanolamine of the $$(HOR)_nNH_{(3-n)}$$

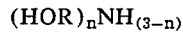

wherein $n$ is an integer having a value of from 1 to 3, inclusive, and R is a divalent alkanediyl radical of from 2 to 3 carbons whose valence bonds are from different carbons, and (2) an alkylbenzene sulfonic acid whose alkyl group is a straight chain alkyl group of from 7 to 20 carbons.

2. The process as claimed in claim 1 wherein said water-soluble inorganic salt is a salt of an alkali metal.

3. The process as claimed in claim 1 wherein said water-soluble inorganic salt is selected from the class consisting of alkali metal chlorides and alkali metal sulfates.

4. The method for producing an aqueous solution of a salt of triethanolamine and an alkylbenzene sulfonic acid which comprises adding a gel-inhibiting amount of a water-soluble salt selected from a member of the group consisting of alkali metal salts of an inorganic acid and alkaline earth metal salts of an inorganic acid to an aqueous medium of triethanolamine and an alkylbenzene sulfonic acid of the formula:

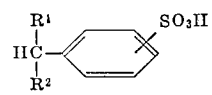

wherein $R^1$ and $R^2$ each are n-alkyl groups of at least 1 carbon atom and the total number of carbons in said $R^1$ and $R^2$ is in the range of from 6 to 19.

5. The process as claimed in claim 4 wherein said water-soluble inorganic salt is a salt of an alkali metal.

6. The process as claimed in claim 4 wherein said water-soluble inorganic salt is selected from the class consisting of alkali metal chlorides and alkali metal sulfates.

References Cited

UNITED STATES PATENTS

| | | | |
|---|---|---|---|
| 2,477,383 | 7/1949 | Lewis | 252—161 |
| 2,712,530 | 7/1955 | Baumgartner | 252—161 |
| 2,723,240 | 11/1955 | Baumgartner | 252—161 |
| 2,944,028 | 7/1960 | Staynor | 252—138 X |
| 3,017,363 | 1/1962 | Wilson | 252—355 X |
| 3,192,166 | 6/1965 | Smith | 252—137 |
| 2,364,767 | 12/1944 | Zizinia et al. | 252—161 |
| 3,005,777 | 10/1961 | Terry | 252—152 |

LEON D. ROSDOL, *Primary Examiner.*

B. BETTIS, *Assistant Examiner.*

U.S. Cl. X.R.

252—135, 161, 320, 324, 363.5